(12) United States Patent
Vo et al.

(10) Patent No.: US 10,406,959 B2
(45) Date of Patent: Sep. 10, 2019

(54) VEHICLE SEATING ASSEMBLY HAVING EXTENDABLE PANEL

(71) Applicant: Ford Global Technologies, LLC, Dearborn, MI (US)

(72) Inventors: Jeffrey Tien Vo, Southfield, MI (US); Robert Gibbons, Southfield, MI (US); Pattrick Loew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/678,301

(22) Filed: Aug. 16, 2017

(65) Prior Publication Data
US 2019/0054848 A1   Feb. 21, 2019

(51) Int. Cl.
| | | |
|---|---|---|
| *B60N 3/00* | (2006.01) | |
| *B60N 2/20* | (2006.01) | |
| *B60N 2/38* | (2006.01) | |
| *B60N 2/36* | (2006.01) | |

(52) U.S. Cl.
CPC ............ *B60N 3/004* (2013.01); *B60N 2/206* (2013.01); *B60N 2002/363* (2013.01)

(58) Field of Classification Search
CPC .. B60N 2002/363; B60N 2/206; B60N 3/004; B60N 2/36
See application file for complete search history.

(56) References Cited

U.S. PATENT DOCUMENTS

| | | | |
|---|---|---|---|
| 5,244,335 A | 9/1993 | Johns | |
| 6,540,295 B1* | 4/2003 | Saberan | B60N 2/206 |
| | | | 297/283.3 |
| 6,598,926 B1* | 7/2003 | Price | B60N 2/06 |
| | | | 296/65.09 |
| 6,648,395 B2 | 11/2003 | Hoshino | |
| 6,698,829 B1* | 3/2004 | Freijy | B60N 2/3011 |
| | | | 296/65.01 |
| 6,702,355 B1* | 3/2004 | Price | B60R 5/045 |
| | | | 296/37.16 |
| 6,729,668 B2 | 5/2004 | Maibom | |

(Continued)

FOREIGN PATENT DOCUMENTS

| | | | | |
|---|---|---|---|---|
| DE | 10105589 C1 * | 4/2002 | | B60N 2/01 |
| DE | 102010018337 A1 * | 10/2011 | | B60R 5/045 |
| WO | WO-2016141168 A1 * | 9/2016 | | B60N 3/004 |

OTHER PUBLICATIONS

Machine translation of foreign reference DE10105589, obtained from http://translationportal.epo.org/emtp/translate/?ACTION=description-retrieval&COUNTRY=DE&ENGINE=google&FORMAT=docdb&KIND=C1&LOCALE=en_EP&NUMBER=10105589&OPS=ops.epo.org/3.2&SRCLANG=de&TRGLANG=en (last accessed on 2018) (Year: 2018).*

(Continued)

*Primary Examiner* — Theodore V Adamos
(74) *Attorney, Agent, or Firm* — Vichit Chea; Price Heneveld LLP

(57) ABSTRACT

A vehicle seating assembly is provided herein. The vehicle seating assembly includes a seat. A seatback is pivotally coupled to the seat. The seatback includes a rear-side. A panel is pivotally coupled to the rear-side of the seatback. The panel is pivotable to extend between a first position that is forward of the seatback and a second position that is rearward of the seatback when the seatback is in a forwardly-folded position.

18 Claims, 11 Drawing Sheets

(56) References Cited

U.S. PATENT DOCUMENTS

| | | | | |
|---|---|---|---|---|
| 7,044,550 B2* | 5/2006 | Kim | ............... | B60N 2/36 |
| | | | | 296/65.09 |
| 9,457,724 B2* | 10/2016 | Lu | ............... | B60R 5/045 |
| 9,573,687 B2 | 2/2017 | Stephens et al. | | |
| 2007/0013201 A1* | 1/2007 | Wagner | ............... | B60N 2/3011 |
| | | | | 296/24.43 |
| 2011/0095571 A1* | 4/2011 | Maguire | ............... | B60N 2/36 |
| | | | | 296/193.07 |
| 2013/0147226 A1* | 6/2013 | Cao | ............... | B60R 5/045 |
| | | | | 296/37.16 |
| 2014/0265417 A1* | 9/2014 | Thota | ............... | B60R 5/04 |
| | | | | 296/65.16 |
| 2014/0265418 A1* | 9/2014 | Thota | ............... | B60N 2/206 |
| | | | | 296/65.16 |
| 2014/0318422 A1* | 10/2014 | Neuhaus | ............... | B60N 2/242 |
| | | | | 108/44 |
| 2015/0061327 A1* | 3/2015 | Millan | ............... | B60N 3/004 |
| | | | | 297/163 |
| 2016/0250958 A1* | 9/2016 | Saada | ............... | B60N 3/004 |
| | | | | 297/163 |

OTHER PUBLICATIONS

Machine translation of foreign reference DE 102010018337, obtained from http://translationportal.epo.org/emtp/translate/?ACTION=description-retrieval&COUNTRY=DE&ENGINE=google&FORMAT=docdb&KIND=A1&LOCALE=en_EP&NUMBER=102010018337&OPS=ops.epo.org/3.2&SRCLANG=de&TRGLANG=en (last accessed on Apr. 19, 2019) (Year: 2019).*

* cited by examiner

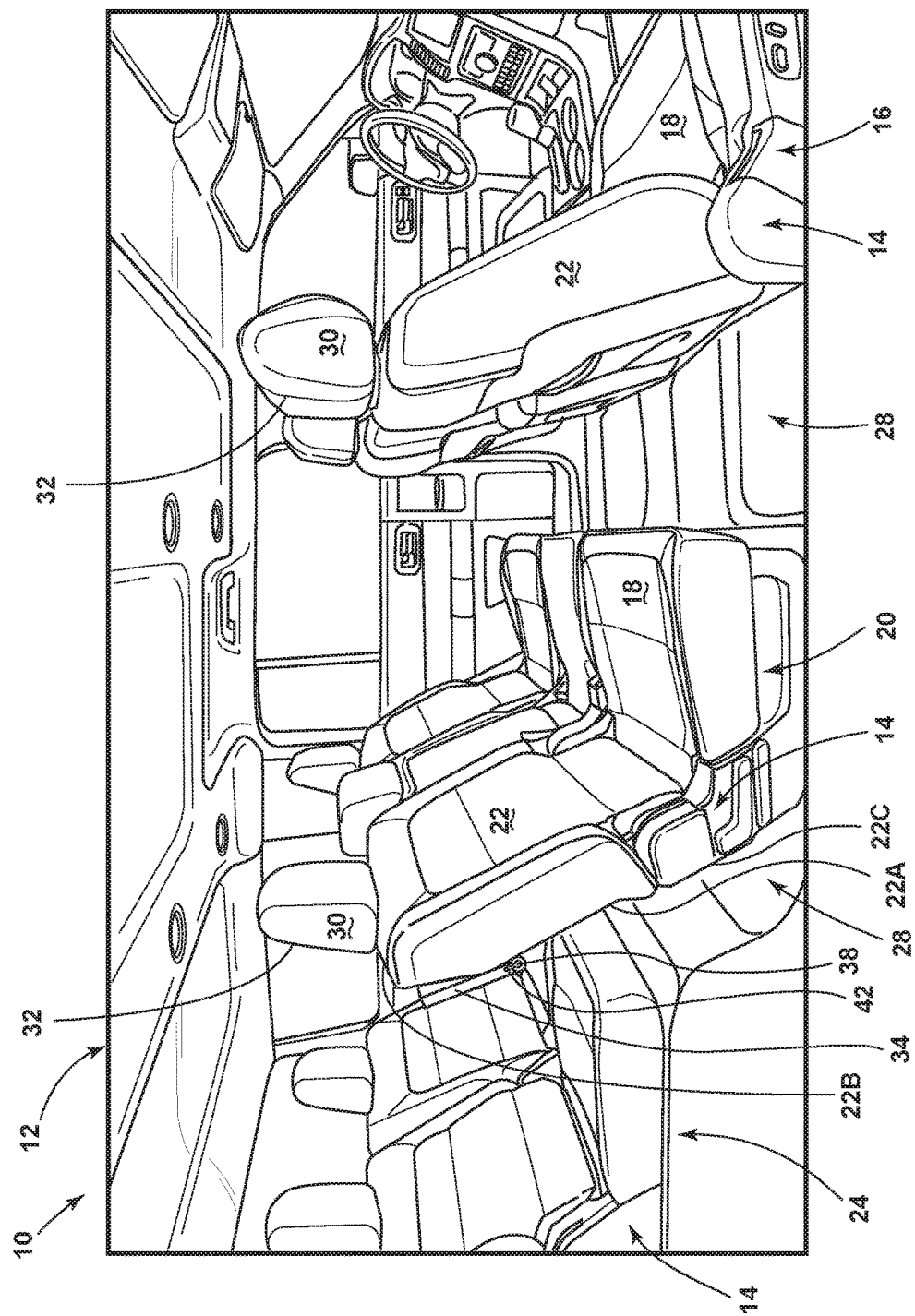

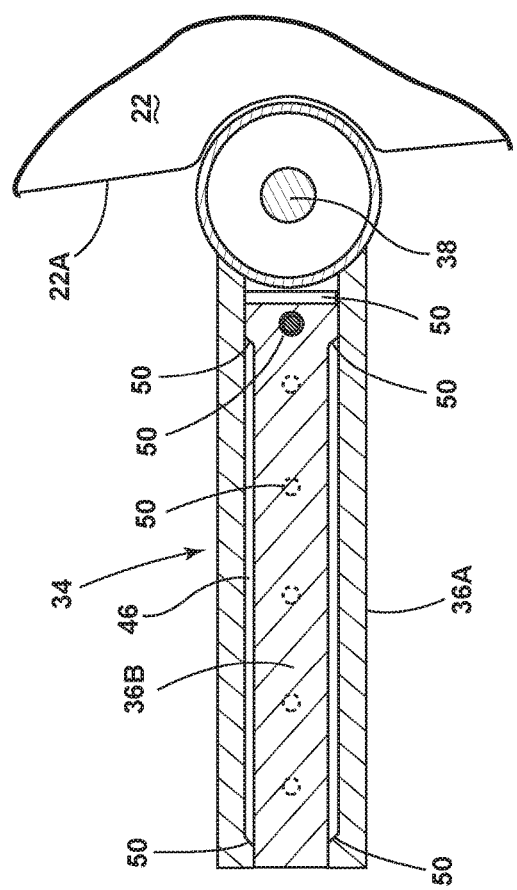
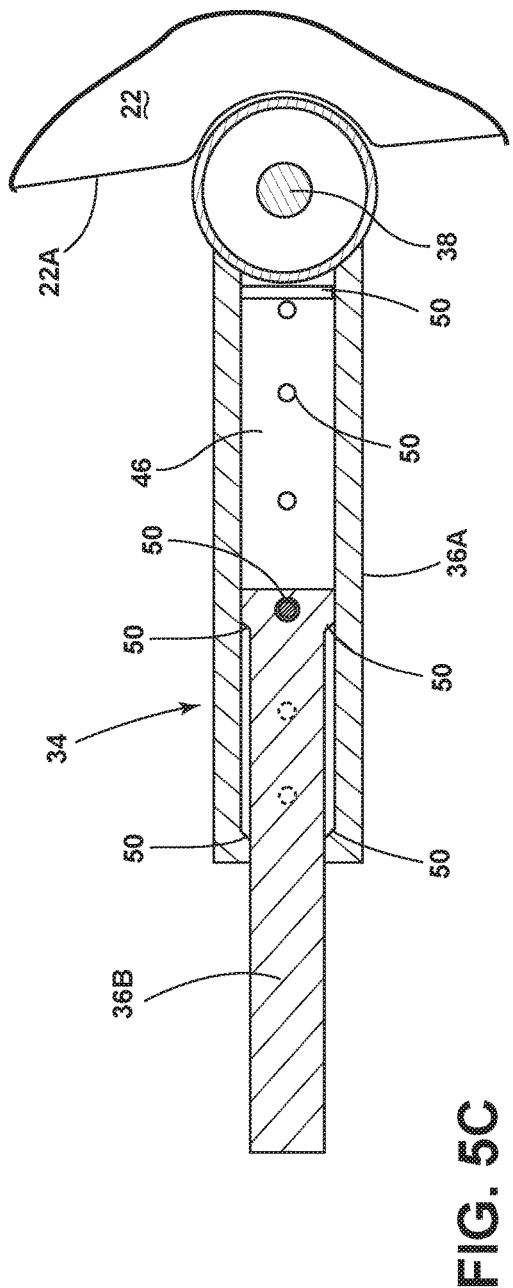
FIG. 5B
FIG. 5C

VEHICLE SEATING ASSEMBLY HAVING EXTENDABLE PANEL

FIELD OF THE INVENTION

The present disclosure generally relates to vehicles and, more particularly, to vehicle seating assemblies.

BACKGROUND OF THE INVENTION

Automotive vehicles are commonly equipped with rows of seating. The rows of seating within vehicles typically include seating assemblies that are forwardly-foldable to optimize cargo space within the vehicle. In some cases, when seating assemblies are folded forward to optimize cargo space, gaps, into which cargo may topple, exist between rows of seating assemblies. Additionally, cargo that is placed on the rear-side of forwardly-folded seating assemblies may damage the exterior of the seating assembly.

SUMMARY OF THE INVENTION

According to one aspect of the present disclosure, a vehicle seating assembly includes a seat. A seatback is pivotally coupled to the seat. A panel is pivotally coupled to a rear-side of the seatback. The panel is pivotable to extend between a first position that is forward of the seatback and a second position that is rearward of the seatback when the seatback is in a forwardly-folded position.

Embodiments of the first aspect of the invention can include any one or a combination of the following features:
  the assembly further comprises a headrest coupled to the seatback, wherein the panel is extendable to cover the headrest when the panel is in the first position forward of the seatback;
  the assembly further comprises a detent mechanism coupled to the seatback and configured to resist pivotal movement of the panel;
  the assembly further comprises a detent mechanism configured to support the panel in a position projecting outwardly from the seatback;
  the seatback defines a recess configured to house the panel;
  the assembly further comprises a retention member that retains the panel within the recess;
  the panel comprises a first panel and a second panel, wherein the second panel extends from the first panel;
  the assembly further comprises a resistive element coupled to the panel that resists at least one of an extension and a contraction of the second panel relative to the first panel;
  the second panel is configured to extend telescopically relative to the first panel; and
  the second panel is configured to translationally extend relative to the first panel.

According to another aspect of the present invention, a vehicle seating assembly includes a seatback having a rear-side. A panel is pivotally coupled to the rear-side. The panel is pivotable between at least a first position and a second position. The panel is extendable beyond an upper end of the rear-side while in the first position, and the panel is extendable beyond a lower end of the rear-side while in the second position.

Embodiments of the second aspect of the invention can include any one or a combination of the following features:
  the assembly further comprises a headrest coupled to the seatback, wherein the panel is extendable to cover the headrest when the panel is in the first position forward of the seatback;
  the assembly further comprises a detent mechanism coupled to the seatback and configured to resist pivotal movement of the panel;
  the assembly further comprises a detent mechanism configured to support the panel in a position projecting outwardly from the seatback;
  the seatback defines a recess configured to house the panel;
  the assembly further comprises a retention member that retains the panel within the recess;
  the panel comprises a first panel and a second panel, wherein the second panel extends from the first panel;
  the assembly further comprises a resistive element coupled to the panel that resists at least one of an extension and a contraction of the second panel relative to the first panel;
  the second panel is configured to extend telescopically relative to the first panel; and
  the second panel is configured to translationally extend relative to the first panel.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2C is an enlarged elevational view of the vehicle interior illustrating the panel in an upward position, according to one example;

FIG. 5B is a cross-sectional view taken through line VB-VB of FIG. 5A with the panel in the retracted position;

FIG. 5C is a cross-sectional view taken through line VC-VC of FIG. 5A with the panel in the extended position;

DETAILED DESCRIPTION OF THE PREFERRED EMBODIMENTS

Figure 1:
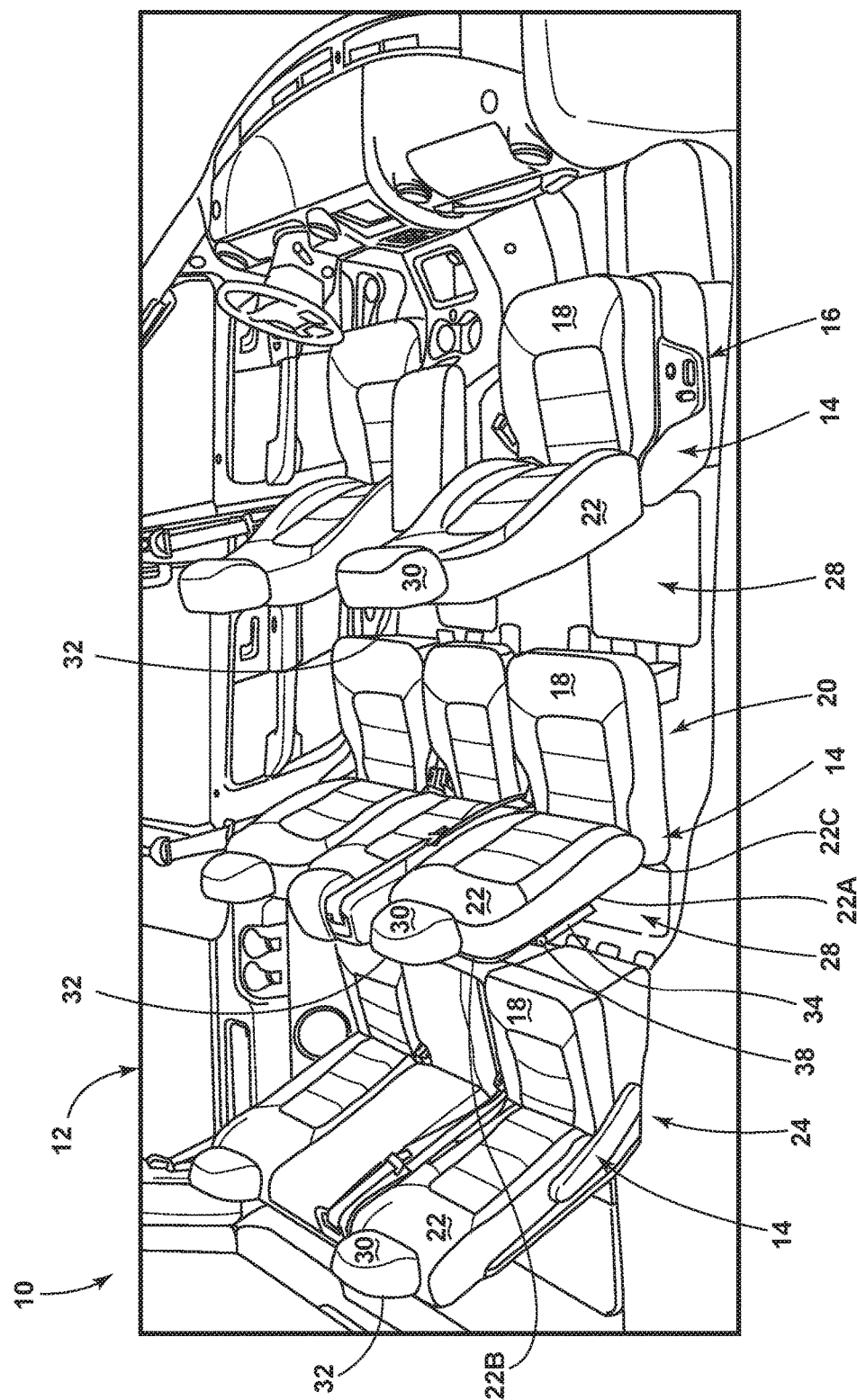
FIG. 1 is an upper perspective view of a vehicle interior equipped with multiple rows of seating assemblies, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-7, reference numeral 10 generally designates a vehicle generally shown in the form of a wheeled automotive vehicle. The vehicle 10 includes a plurality of vehicle seating assemblies 14 generally arranged in rows for seating passengers. Each vehicle seating assembly 14 includes a seat 18 and a seatback 22 pivotally coupled to the seat 18. A panel 34 is pivotally coupled to the rear-side 22A of the seatback 22 and pivots to extend between a first position forward of the seatback 22 and a second position rearward of the seatback 22 when the seatback 22 is in a forwardly-folded position.

Referring now to FIG. 1, the vehicle 10 has the plurality of seating assemblies 14 shown arranged in a first row 16, a second row 20, and a third row 24 within the vehicle interior 12. In some embodiments, the vehicle interior 12 may have more or fewer rows of seating, and each row may have one or more seating assemblies 14. It is understood that the features of this invention are still applicable in such embodiments. The first row 16, second row 20, and/or third row 24 of seating may be configured as bench seats or bucket seats. The first row 16, second row 20, and/or third row 24 exemplified in FIG. 1 are oriented in the vehicle forward direction. However, in light of the emergence of autonomous vehicles, which can be oriented without traditionally configured rows of seating, it will be understood that the features of this invention are still applicable in the absence of such rows. There may be a plurality of gaps 28 between the first row 16, second row 20, third row 24, and/or additional rows of seating.

Figure 6:
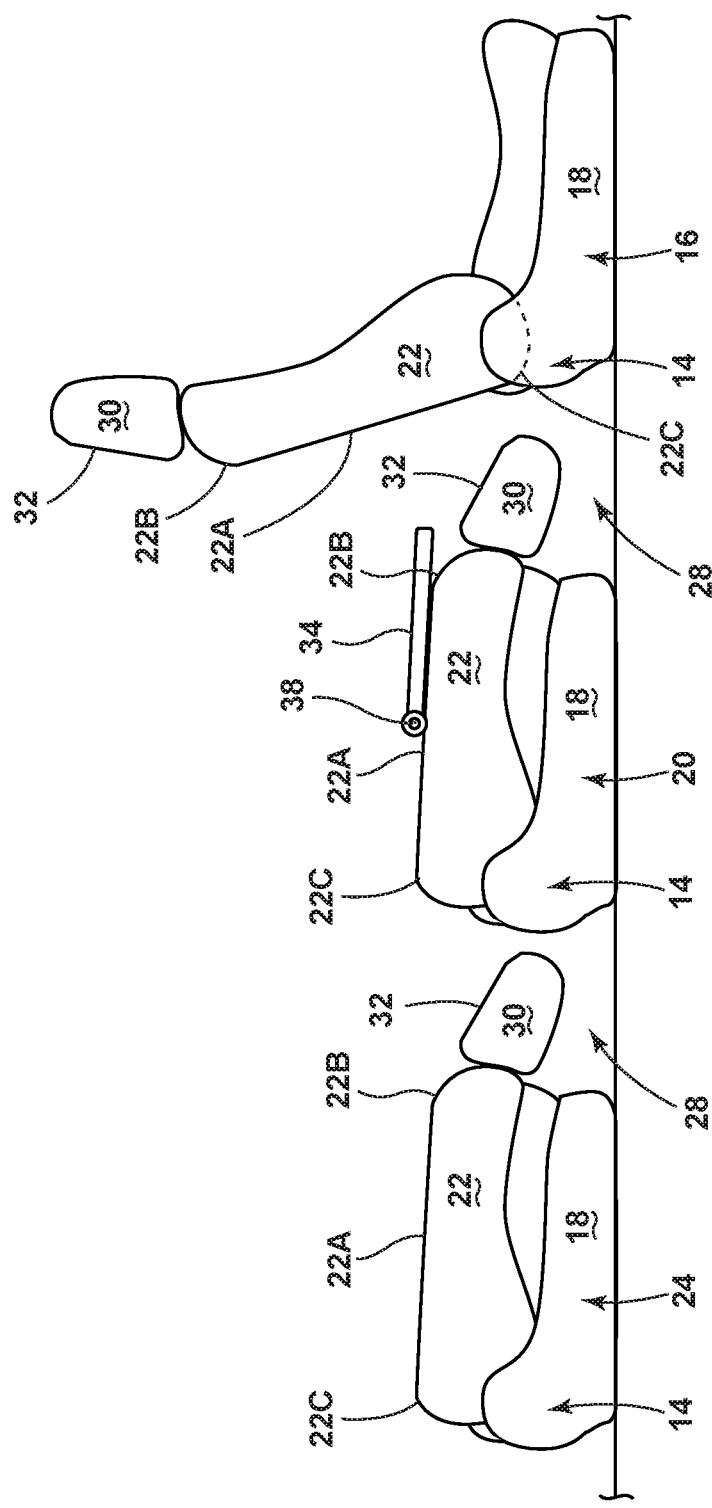
FIG. 6 is a side elevational view of the vehicle seating assemblies illustrating the panel used as a cover when the seating assembly is folded forward.
Figure 7:
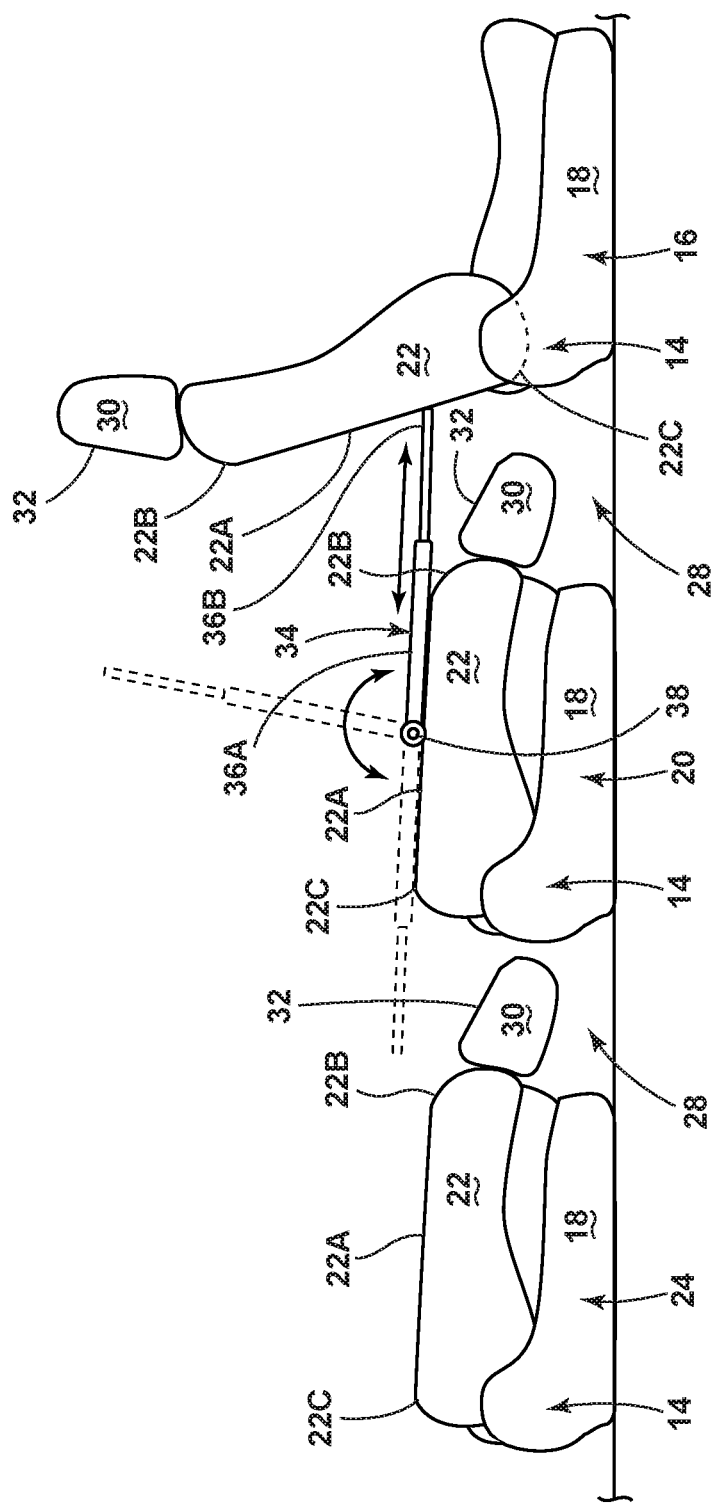
FIG. 7 is a side elevational view of the vehicle seating assemblies illustrating the panel extended forward in solid lines and rearward in phantom.

The first row 16, the second row 20, and/or the third row 24 of seating assemblies 14 may include one or more seating assemblies 14 equipped with the panel 34. Each seating assembly 14 includes the seat 18 and the seatback 22. The seatback 22 may be pivotally coupled to the seat 18, such that the seatback 22 may pivot or fold in the forward direction as shown in FIGS. 6 and 7. This forward folding of the seatback 22 serves a multitude of purposes, including increasing trunk space for cargo that may be placed on the folded seatback 22.

The seatback 22 includes a rear-side 22A. The rear-side 22A is generally vertical in the upright unfolded position and is generally horizontal in the folded position shown in FIGS. 6 and 7. The rear-side 22A includes an upper end 22B and a lower end 22C. A headrest 30 having a headrest rear-side 32 may be coupled to the upper end 22B of the seatback 22.

The panel 34 is coupled to the rear-side 22A of the seatback 22. The panel 34 may be pivotally coupled to the seatback 22. In one embodiment, the panel 34 is pivotally coupled to the rear-side 22A of the seatback 22 at a location between the lower end 22C and the upper end 22B. The panel 34 may be pivotally coupled to the center of the rear-side 22A of the seatback 22 along a generally horizontal axis relative to the seating assembly 14 as shown in FIGS. 1-5A and 6-7. However, the panel 34 may be pivotally coupled to other portions of the rear-side 22A, the seatback 22, and/or the seating assembly 14 at large, according to other embodiments. In some embodiments, the panel 34 may be pivotally coupled by a hinge. In some embodiments, the panel 34 may be integrally formed with or molded into the rear-side 22A, the seatback 22, and/or the seating assembly 14 and pivot about a living hinge or similar structure. In some embodiments, in which the panel 34 is not integrally formed with or molded into the rear-side 22A, the seatback 22, and/or the seating assembly 14, the panel 34 may similarly pivot by bending and/or folding.

The panel 34 may be composed of a rigid material and/or a flexible material. Accordingly, the panel 34 may be composed of plastic, wood, stone, metal, rubber, fabric, cloth, mesh, netting, and/or a combination thereof. Additionally, the panel 34 may be composed of the same material as the exterior of the seating assembly 14, or the exterior of the portion of the seating assembly 14, to which the panel 34 is coupled. For example, if the exterior of the seating assembly 14 is composed of leather, the panel 34 may likewise be composed of leather, either in part or entirely.

Figure 5A:
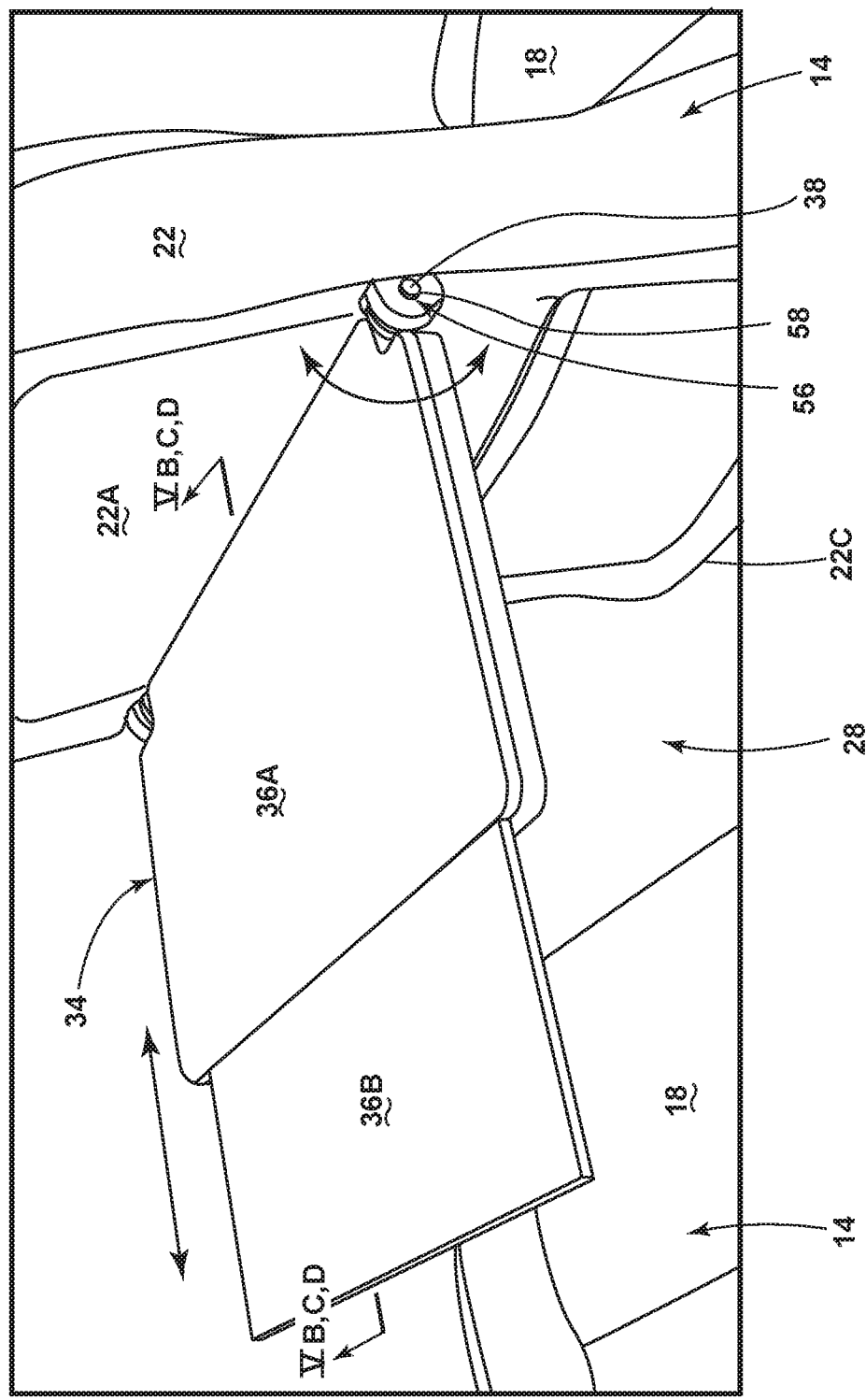
FIG. 5A is a rear perspective view of the panel in an extended position, according to one embodiment.

As shown in FIG. 5A, the panel 34 may be a generally rectangular prism. However, it is contemplated that the panel 34 may be any suitable shape. If the panel 34 is flexible, the panel 34 may take various forms. The panel 34 may be the shape of the rear-side 22A of the seatback 22. In some embodiments, the panel 34 may be extendable, such that the shape and size of the panel 34 changes.

The panel 34 may pivot about a pivot axis 38. In one embodiment, the pivot axis 38 may be provided by one or more pivot pins 58 engaged in one or more openings 56. As shown in FIGS. 1-7, the pivot axis 38 may be generally horizontal or, in other words, generally lateral with respect to the seating assembly 14. However, the pivot axis 38 may be generally vertical or oriented in a direction between horizontal and vertical. The panel 34 may have a range of pivotal motion of about 180 degrees. The panel 34 may be configured to pivot about the pivot axis 38 in either rotational direction until the panel 34 is mechanically stopped by making contact with the rear-side 22A of the seatback 22 on either side of the pivot axis 38. The panel 34 may be configured to pivot in either direction about the pivot axis 38 until it is about parallel with the rear-side 22A.

Figure 3B:
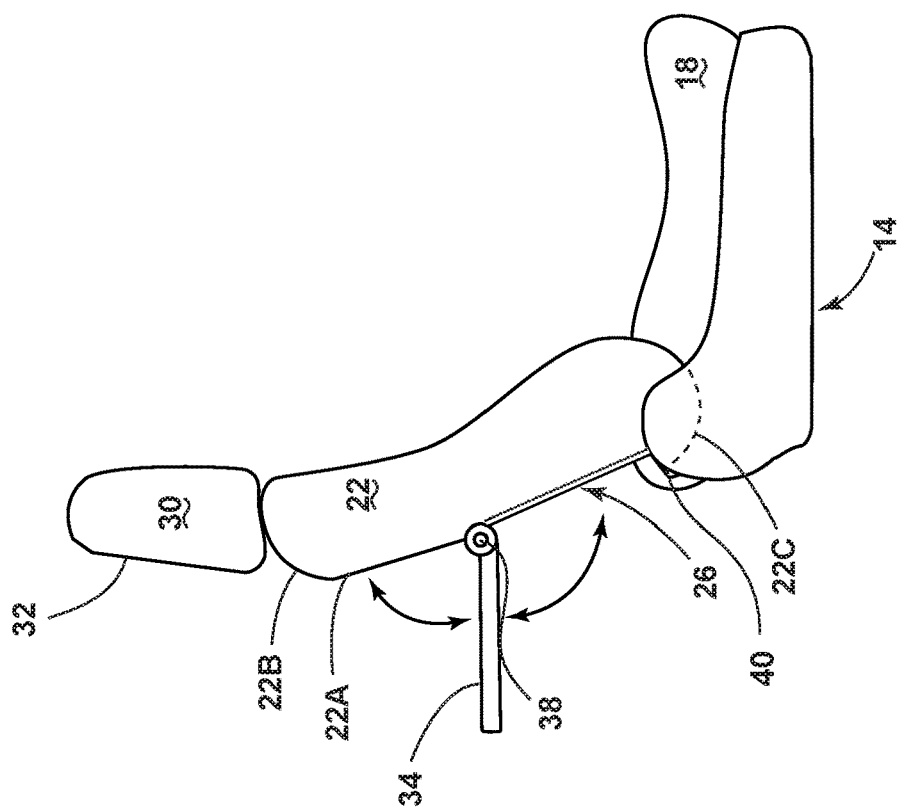
FIG. 3B is a side elevational view of the seating assembly illustrating the panel in the tray position, according to one example.
Figure 3A:
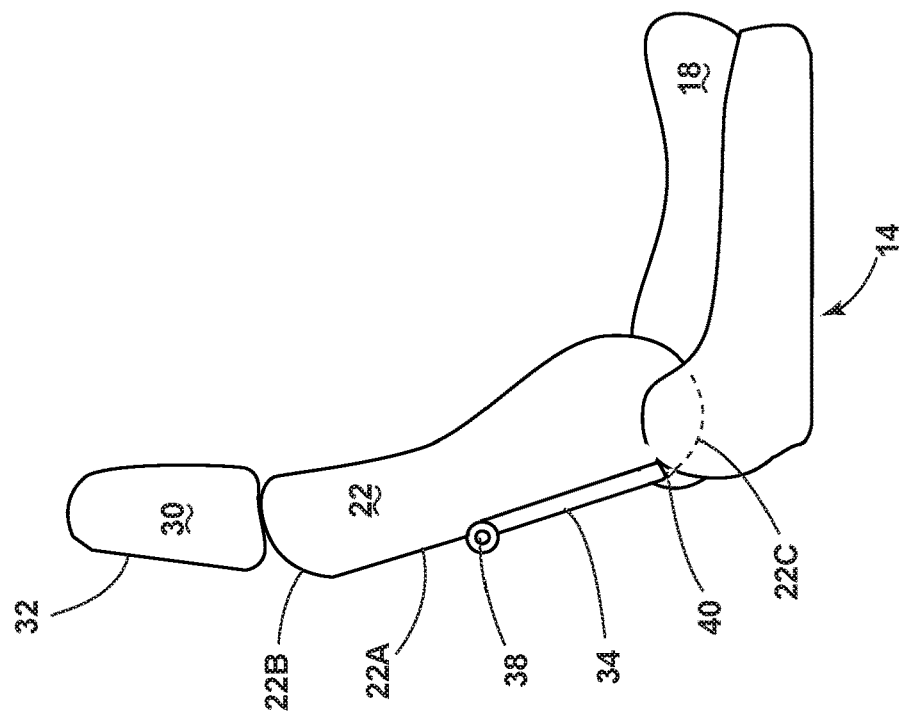
FIG. 3A is a side elevational view of the seating assembly illustrating the panel in the downward stowed position, according to one example.

In reference to FIGS. 3A and 3B, in some embodiments, the panel 34 may be configured to pivot into, and be housed by, a recess 26 in the rear-side 22A of the seatback 22. The recess 26 may be shaped such that the panel 34 is substantially planar with the surrounding rear-side 22A while the panel 34 is housed within the recess 26. As depicted in FIGS. 3A and 3B, the recess 26 may be on the lower side of the rear-side 22A of the seatback 22 relative to the pivot axis 38. In this orientation, the distal end of the panel 34 may be directed towards the lower end 22C of the rear-side 22A of the seatback 22 when the panel 34 is housed within the recess 26. In certain embodiments, the recess 26 may be on the upper side of the rear-side 22A of the seatback 22 relative to the pivot axis 38, such that the distal end of the panel 34 would be directed towards the upper end 22B of the rear-side 22A when the panel 34 is housed within the recess 26.

In some embodiments, a retention member 40 may be coupled to the rear-side 22A of the seatback 22. The retention member 40 may retain the panel 34 within the recess 26. The retention member 40 may be, but is not limited to, a clip, hook and loop (e.g., Velcro®), lock, pin, tab, snap, magnet, or adhesive and/or a combination thereof.

Figure 4:
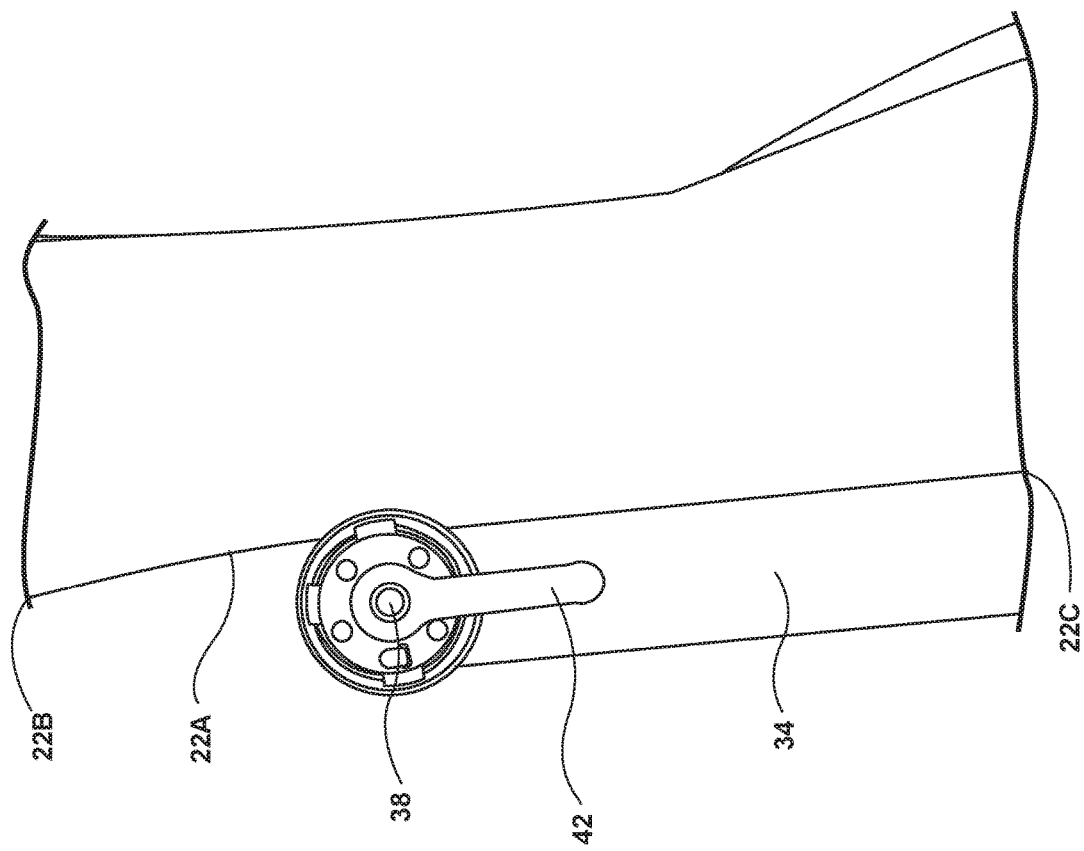
FIG. 4 is an enhanced view of a detent mechanism for the panel of the seating assembly, according to one embodiment.

In reference to FIG. 4, a detent mechanism 42 is shown coupled to the seatback 22 and is configured to resist pivotal movement of the panel 34 relative to the seatback 22. The detent mechanism 42 may be a ratchet, lug and stop, friction hinge, pin, pawl, locking feature, or piston, and/or a combination thereof. It is understood that any suitable mechanism for resisting the pivotal movement of the panel 34 may be employed. In some embodiments, the detent mechanism 42 may be configured to resist pivotal movement of the panel 34 relative to the seatback 22 such that the panel 34 is substantially fixed relative to the seatback 22. In some embodiments, the detent mechanism 42 may be configured to yieldingly resist pivotal movement of the panel 34 relative to the seatback 22. In some embodiments, the detent mechanism 42 may be configured to both yieldingly resist pivotal movement of the panel 34 relative to the seatback 22 and resist pivotal movement of the panel 34 relative to the seatback 22 such that the panel 34 is substantially fixed relative to the seatback 22.

Figure 2A:
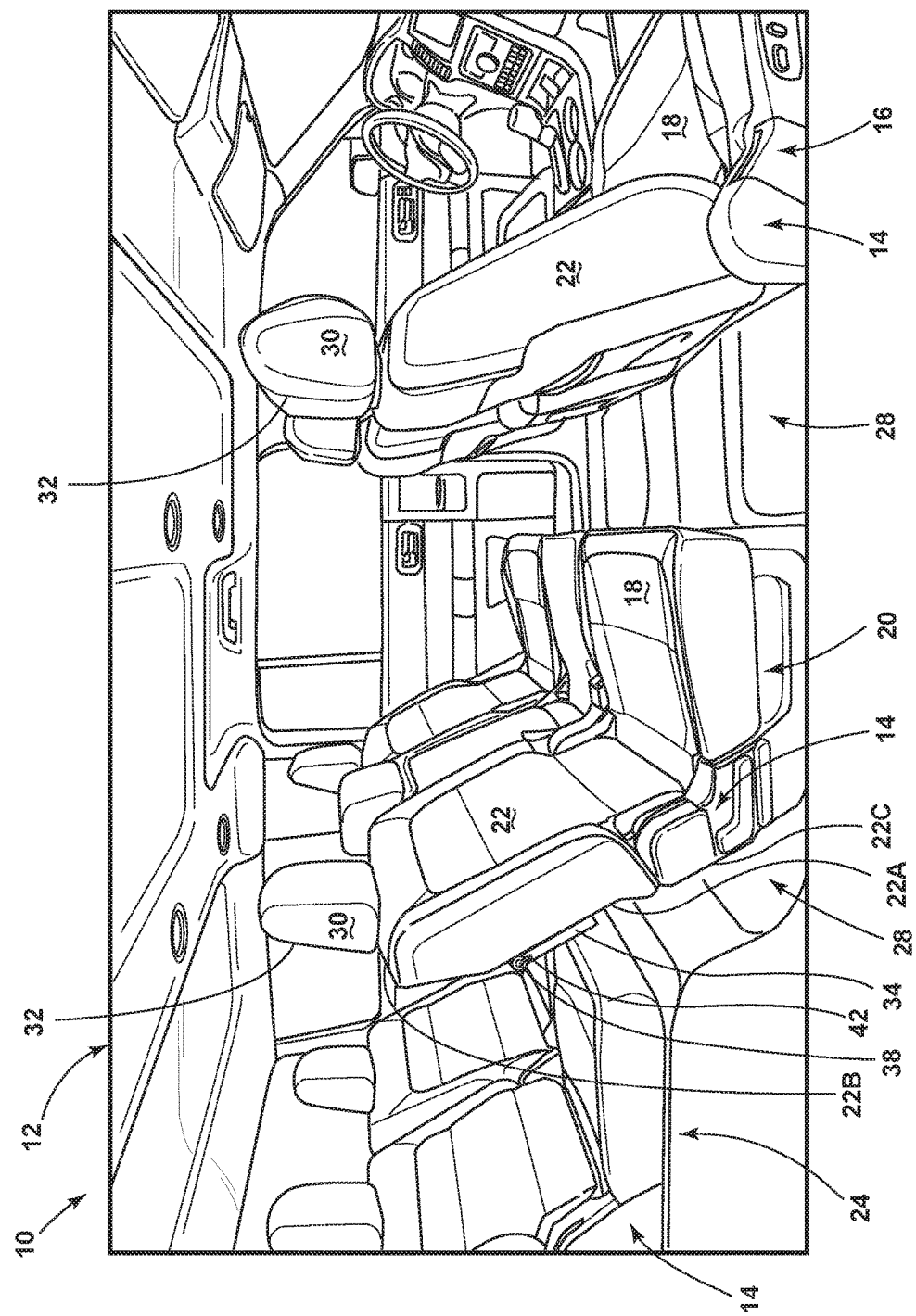
FIG. 2A is an enlarged elevational view of the vehicle interior illustrating a panel on a seating assembly in a downward stowed position, according to one example.
Figure 2B:
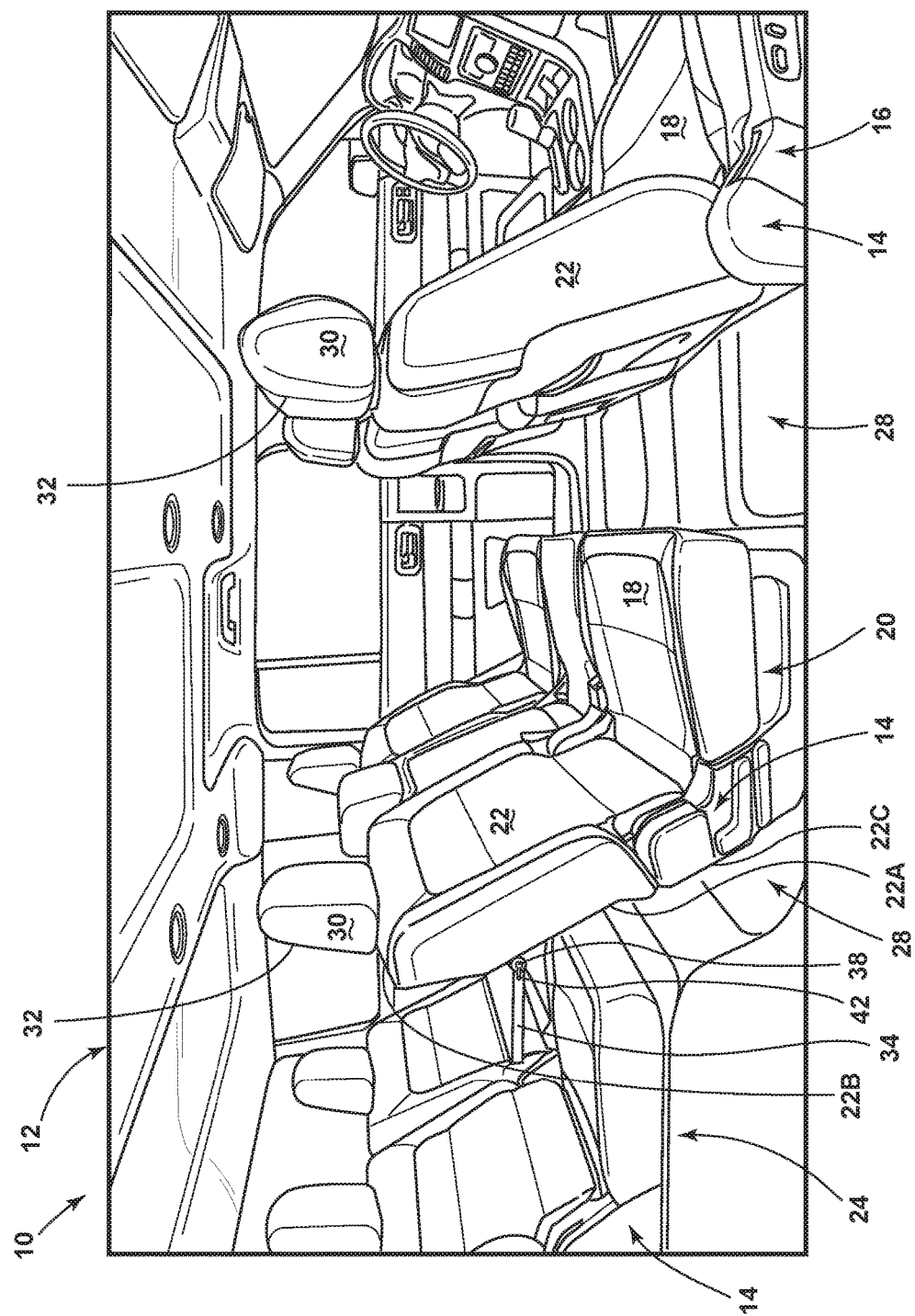
FIG. 2B is an enlarged elevational view of the vehicle interior illustrating the panel in a tray position, according to one example.

In some embodiments, the detent mechanism 42 may be configured to support the panel 34 in a position in which the panel 34 is projecting outwardly from the seatback 22, as is shown in FIG. 2B. Such an orientation of the panel 34 may allow a vehicle occupant to use the panel 34 as a tray-table from the seating assembly 14 positioned vehicle rearward of the panel 34. In some embodiments, the detent mechanism 42 may be configured to resist pivotal movement of the panel 34 when the panel 34 is substantially parallel to the rear-side 22A of the seatback 22, as is depicted in FIGS. 2A and 2C. In some embodiments, the detent mechanism 42 may be configured to resist pivotal movement of the panel 34 when the panel 34 is housed within the recess 26. In some embodiments, the detent mechanism 42 may be configured to resist pivotal movement of the panel 34 while the panel 34 is in any rotational position.

In reference to FIGS. 5A-D and 7, the panel 34 includes a first panel 36A and a second panel 36B which extends from the first panel 36A. The second panel 36B may be composed of a rigid material and/or a flexible material. Accordingly, the second panel 36B may be composed of plastic, wood, stone, metal, rubber, fabric, cloth, mesh, netting, and/or a combination thereof. Additionally, the second panel 36B may be composed of the same material as the exterior of the seating assembly 14, or the exterior of the portion of the seating assembly 14, to which the first panel 36A is coupled. For example, if the exterior of the seating assembly 14 is composed of leather, the second panel 36B may likewise be composed of leather, either in part or entirely.

The second panel 36B may be a generally rectangular prism. However, it is contemplated that the second panel 36B may be any suitable shape that may be similar or different from the shape of the first panel 36A.

The second panel 36B may extend from, and contract towards, the first panel 36A in any conceivable way that would be known to a person having ordinary skill in the art. For example, the second panel 36B may extend and contract relative to the first panel 36A in a manner similar to opening a book and closing a book by utilizing a hinge that couples the first panel 36A to the second panel 36B. In some examples, the second panel 36B may extend and contract relative to the first panel 36A in a manner similar to a jack-knife opening and closing by utilizing a swivel that couples the first panel 36A to the second panel 36B. In some examples, the second panel 36B may extend and contract relative to the first panel 36A by stretching, unfolding, unrolling, and/or unfurling.

As depicted in FIGS. 5A-D and 7, the second panel 36B may extend from, and contract towards, the first panel 36A via translation. In some examples, the second panel 36B translates along a path that is about parallel to the radial position of the first panel 36A relative to the pivot axis 38.

In some examples, the second panel 36B may extend and contract translationally relative to the first panel 36A by utilizing a track and wheels that roll along the track. In some examples, the second panel 36B may extend and contract translationally relative to the first panel 36A by sliding along grooves of the second panel 36B, and/or the first panel 36A. It is contemplated that various other structures known to a person having ordinary skill in the art could be utilized to translate the second panel 36B relative to the first panel 36A.

The second panel 36B may be oriented relative to the first panel 36A in a multitude of ways. For example, the second panel 36B may be positioned atop, beneath, and/or side-by-side the first panel 36A. As depicted in FIGS. 5A-D, in some examples, the second panel 36B may be nested within a cavity 46 of the first panel 36A. In such examples, the second panel 36B may move telescopically into and out of the cavity 46 of the first panel 36A in movements of contraction and extension respectively.

It is contemplated that any number of panels beyond the second panel 36B may extend from the first panel 36A, the second panel 36B, and/or any additional panel(s).

Figure 5D:
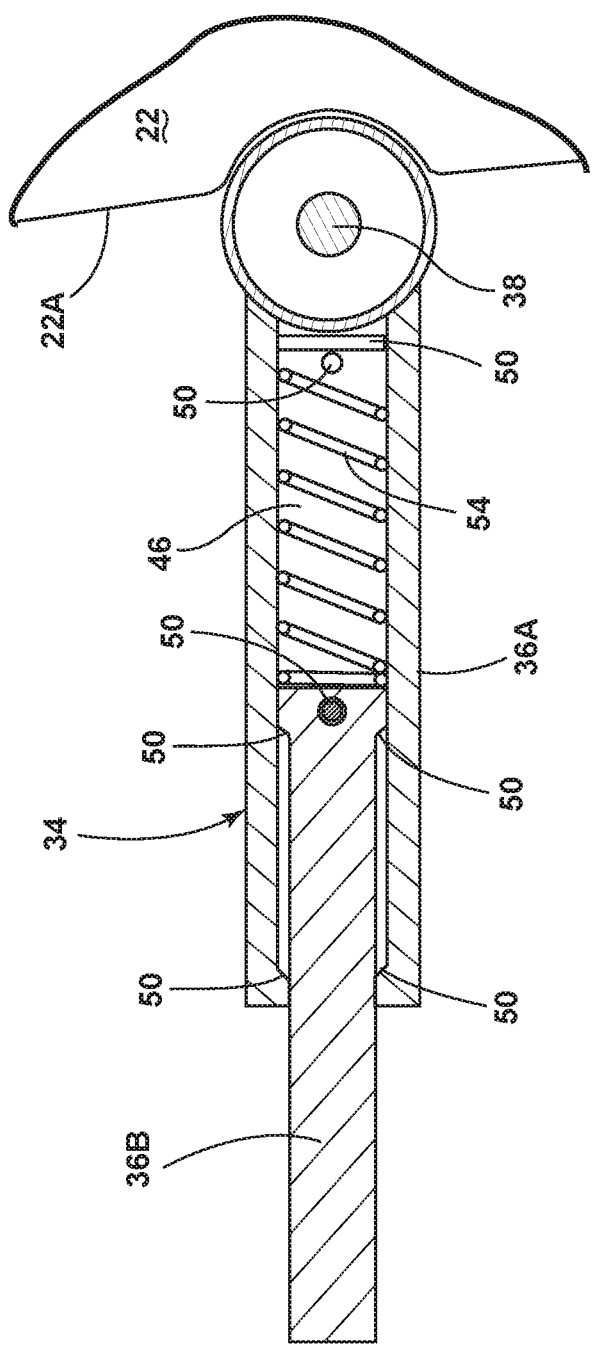
FIG. 5D is a cross-sectional view taken through line VD-VD of FIG. 5A with the panel in the extended position.

Referring now to FIGS. 5B-D, a resistive element 50 is coupled to the first panel 36A and/or the second panel 36B and may resist at least one of extension and contraction of the second panel 36B relative to the first panel 36A. The resistive element 50 may be a pin, detent, friction, locking feature, catch, dog, and/or a combination thereof. However, it is contemplated that the resistive element 50 may be any suitable resistive feature or combination of features known to one having ordinary skill in the art. In some embodiments, the resistive element 50 may be configured to resist extension and/or contraction of the second panel 36B relative to the first panel 36A, such that the second panel 36B is substantially fixed relative to the first panel 36A. In some embodiments, the resistive element 50 may be configured to yieldingly resist extension and/or contraction of the second panel 36B relative to the first panel 36A. In some embodiments, the resistive element 50 may be configured to both yieldingly resist extension and/or contraction the second panel 36B relative to the first panel 36A and resist extension and/or contraction of the second panel 36B relative to the first panel 36A such that the second panel 36B is substantially fixed relative to the first panel 36A.

In some embodiments, the resistive element 50 may provide intermediate resistance by resisting an extension and/or a contraction of the second panel 36B relative to the first panel 36A when the second panel 36B is not fully extended or contracted relative to the first panel 36A. In some embodiments, the resistive element 50 may provide end-point resistance when the second panel 36B is either fully extended or fully contracted relative to the first panel 36A by resisting an over-extension and/or an over-contraction of the second panel 36B relative to the first panel 36A. In some embodiments, the resistive element 50 may provide both intermediate resistance and end-point resistance.

Referring now to FIG. 5D, a biasing member 54 is coupled to the second panel 36B and is configured to bias the second panel 36B to extend relative to the first panel 36A. The biasing member 54 may allow the second panel 36B to extend relative to the first panel 36A with minimal user effort, upon the user disengaging the resistive element 50. The biasing member 54 may be a spring, elastic band, pulley, electric motor, piston, and/or a combination thereof. Additionally, it is contemplated that the biasing member 54 may be any suitable biasing feature or combination of features known to one having ordinary skill in the art.

In reference to FIGS. 6 and 7, in operation, a user may forwardly fold the seating assembly 14 shown in the second row 20 to which the panel 34 is pivotally coupled. While the second row 20 seating assembly 14 is in the forwardly-folded position, the user may pivot the panel 34 to the first position forward of the second row 20 seatback 22. In some examples, when the panel 34 is in the first position forward of the second row 20 seatback 22, the panel 34 may form a generally planar surface relative to the rear-side 22A of the second row 20 seatback 22. In other words, a surface of the panel 34 and the rear-side 22A of the second row 20 seatback 22 may be generally parallel to one another and oriented relative to one another such that the panel 34 and the rear-side 22A of the second row 20 seatback 22 virtually or physically coincide to form a surface that may extend substantially horizontally. In some embodiments, when the panel 34 is in the first position forward of the second row 20 seatback 22, the panel 34 may extend to partially bridge the gap 28 between the second row 20 seating assembly 14 and the first row 16 seating assembly 14. In such examples, the panel 34 may additionally, or alternatively, extend to majorly, substantially, and/or completely bridge the gap 28. In some examples, when the panel 34 is in the first position forward of the second row 20 seatback 22, the panel 34 may extend such that it contacts the first row 16 seating assembly 14. In some examples, when the panel 34 is in the first position forward of the second row 20 seatback 22, and when the headrest 30 is coupled to the second row 20 seating assembly 14, the panel 34 may extend to cover the headrest rear-side 32 of the second row 20 seating assembly 14.

In operation, the user may pivot the panel 34 to the second position rearward of the second row 20 seatback 22 when the seating assembly 14 is in the forwardly-folded position. In some embodiments, when the panel 34 is in the second position rearward of the second row 20 seatback 22, the panel 34 may form a generally planar surface relative to the rear-side 22A of the second row 20 seatback 22. In some examples, when the panel 34 is in the second position rearward of the second row 20 seatback 22, the panel 34 may extend to partially bridge the gap 28 between the second row 20 seating assembly 14 and the third row 24 seating assembly 14. In such examples, the panel 34 may additionally, or alternatively, extend to majorly, substantially and/or completely bridge the gap 28. In some examples, when the panel 34 is in the second position rearward of the second row 20 seatback 22, the panel 34 may extend such that it contacts the third row 24 seating assembly 14. In some examples, when (1) the panel 34 is in the second position rearward of the second row 20 seatback 22, and (2) the third row 24 seating assembly 14 is in the forwardly folded position, the panel 34 may extend such that it contacts, and/or forms a generally planar surface with, the third row 24 seatback 22. In some examples, when (1) the panel 34 is in the second position rearward of the second row 20 seatback 22, (2) the third row 24 seating assembly 14 is in the forwardly folded position, and (3) the headrest 30 is coupled to the third row 24 seating assembly 14, the panel 34 may extend to cover the third row 24 seating assembly 14 headrest rear-side 32.

In some examples, the user may utilize the detent mechanism 42 to resist pivotal movement of the panel 34. For example, the user may utilize the detent mechanism 42 to securely maintain the panel 34 in the first position forward of the second row 20 seatback 22 and/or the second position rearward of the second row 20 seatback 22.

As explained above, in some embodiments, the second panel 36B extends from the first panel 36A of the panel 34. In some examples, while the second row 20 seating assembly 14 is in the forwardly-folded position, and the panel 34 is pivoted toward and/or beyond the upper end 22B of the rear-side 22A of the second row 20 seatback 22, the second panel 36B may extend from the first panel 36A to form a generally planar surface relative to the first panel 36A and/or the rear-side 22A of the second row 20 seatback 22. In some examples, when the panel 34 is pivoted toward and/or beyond the upper end 22B of the rear-side 22A of the second row 20 seatback 22, the second panel 36B may extend to partially bridge the gap 28 between the second row 20 seating assembly 14 and the first row 16 seating assembly 14. In such examples, the second panel 36B may additionally, or alternatively, extend to majorly, substantially, and/or completely bridge the gap 28. In some examples, when the panel 34 is pivoted toward and/or beyond the upper end 22B of the rear-side 22A of the second row 20 seatback 22, the second panel 36B may extend such that it contacts the first row 16 seating assembly 14. In some examples, when (1) the panel 34 is pivoted toward and/or beyond the upper end 22B of the rear-side 22A of the second row 20 seatback 22, and (2) the headrest 30 is coupled to the second row 20 seating assembly 14, the second panel 36B may extend to cover the second row 20 headrest rear-side 32.

When the second row 20 seating assembly 14 is in the forwardly-folded position, and the panel 34 is pivoted toward and/or beyond the lower end 22C of the rear-side 22A of the second row 20 seatback 22, the second panel 36B may extend to form a generally planar surface relative to the first panel 36A and/or the rear-side 22A of the second row 20 seatback 22. In some examples, when the panel 34 is pivoted toward and/or beyond the lower end 22C of the rear-side 22A of the second row 20 seatback 22, the second panel 36B may extend to partially bridge the gap 28 between the second row 20 seating assembly 14 and the third row 24 seating assembly 14. In such examples, the second panel 36B may additionally, or alternatively, extend to majorly, substantially, and/or completely bridge the gap 28. In some examples, when the panel 34 is pivoted toward and/or beyond the lower end 22C of the rear-side 22A of the second row 20 seatback 22, the second panel 36B may extend such that it contacts the third row 24 seating assembly 14. In some examples, when (1) the panel 34 is pivoted toward and/or beyond the lower end 22C of the rear-side 22A of the second row 20 seatback 22, and (2) the third row 24 seating assembly 14 is in the forwardly-folded position, the second panel 36B may extend such that it contacts, and/or forms a generally planar surface with, the third row 24 seatback 22. In some examples, when (1) the panel 34 is pivoted toward and/or beyond the lower end 22C of the rear-side 22A of the second row 20 seatback 22, (2) the third row 24 seating assembly 14 is in the forwardly-folded position, and (3) the headrest 30 is coupled to the third row 24 seating assembly 14, the second panel 36B may cover the third row 24 headrest rear-side 32.

In some examples, the user may utilize the detent mechanism 42 to resist pivotal movement of the first panel 36A and the second panel 36B. For example, the user may utilize the detent mechanism 42 to securely maintain the position of the first panel 36A and the second panel 36B when the first panel 36A is pivoted toward and/or beyond the lower end 22C of the rear-side 22A of the second row 20 seatback 22 and/or toward and/or beyond the upper end 22B of the rear-side 22A of the second row 20 seatback 22.

In some examples, the user may utilize the resistive element 50 to resist at least one of an extension or a contraction of the second panel 36B relative to the first panel 36A. For example, the user may engage the resistive element 50 when the second panel 36B is extended to cover a gap 28 so that the second panel 36B continues to bridge the gap 28 securely. In some examples, the user may engage the resistive element 50 when the second panel 36B is contracted relative to the first panel 36A. In such examples, the resistive element 50 may retain the second panel 36B in a more compact position that may be preferable for storing the first panel 36A and/or the second panel 36B in non-use positions and/or within the recess 26.

As explained above, in some examples, the biasing member 54 biases the second panel 36B in the way of extension relative to the first panel 36A. For such examples, in operation, a user may disengage the resistive element 50, and the biasing member 54 may bias the second panel 36B to extend relative to the first panel 36A. This may reduce the user input necessary to desirably position the second panel 36B relative to the first panel 36A.

It is contemplated that the first panel 36A and/or the second panel 36B may be coupled to the first row 16 seating assembly 14 and/or the third row 24 seating assembly 14 in addition to being coupled to the second row 20 seating assembly 14. In operation, this may allow a user to bridge multiple gaps 28 and/or cover multiple headrests 30 by pivoting the first panels 36A and/or second panels 36B to various desired positions.

Use of the present disclosure may provide a variety of advantages. First, the first panel 36A and/or the second panel 36B may conveniently reorient the trunk space of the vehicle 10 by extending to cover the gaps 28 between the rows of seating. In doing so, the first panel 36A and/or the second panel 36B may extend the storage surface provided by the rear-sides 22A of the folded seatbacks 22. Second, the first panel 36A and/or the second panel 36B, while in the first position forward of the second row 20 seatback 22, may extend to cover the second row 20 headrest rear-side 32 and may, consequently, prevent cargo from marring the appearance headrest rear-side 32. Third, the first panel 36A and/or the second panel 36B, while in the second position rearward of the second row 20, seatback 22, may extend to cover the headrest rear-side 32 that is coupled to the third row 24 seating assembly 14 and may, consequently, prevent cargo from marring the appearance of the headrest rear-side 32. Fourth, in some examples, the first panel 36A and/or the second panel 36B may be used as a tray-table for users that are seated in the row of seating vehicle rearward of the panel 34. Fifth, in various examples, the second panel 36B may extend from first panel 36A to cover the headrests 30 and bridge the gaps 28 while the distal end of the first panel 36A remains within the bounds of the upper end 22B and the lower end 22C of the rear-side 22A. In such an example, the first panel 36A and the second panel 36B, while in a contracted position, may be more compact, allowing the second row 20 seating assembly 14 to be more streamlined and aesthetically pleasing as a whole.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle seating assembly comprising:
   a seatback having a rear-side; and
   a panel pivotally coupled to a center portion of the rear-side, wherein the panel is pivotable between at least a first position, a second position, and a third position, and wherein the panel is extendable beyond an upper end of the rear-side while in the first position, extendable beyond a lower end of the rear-side while in the second position, and projects outwardly from the seatback in the third position, wherein the panel is configured for use as a tray-table to a vehicle occupant positioned vehicle rearward of the panel, when the seatback is in an upright position.

2. The vehicle seating assembly of claim 1, further comprising:
   a headrest coupled to the seatback, wherein the panel is extendable to cover the headrest when the panel is in the first position forward of the seatback.

3. The vehicle seating assembly of claim 1, further comprising:
a detent mechanism coupled to the seatback and configured to resist pivotal movement of the panel.

4. The vehicle seating assembly of claim 1, further comprising:
a detent mechanism configured to support the panel in a position projecting outwardly from the seatback.

5. The vehicle seating assembly of claim 1, wherein the seatback defines a recess configured to house the panel.

6. The vehicle seating assembly of claim 5, further comprising:
a retention member that retains the panel within the recess.

7. The vehicle seating assembly of claim 1, wherein the panel comprises:
a first panel and a second panel, wherein the second panel extends from the first panel.

8. The vehicle seating assembly of claim 7, further comprising:
a resistive element coupled to the panel that resists at least one of an extension and a contraction of the second panel relative to the first panel.

9. The vehicle seating assembly of claim 7, wherein the second panel is configured to extend telescopically relative to the first panel.

10. The vehicle seating assembly of claim 7, wherein the second panel is configured to translationally extend relative to the first panel.

11. A vehicle seating assembly, comprising:
a seat;
a seatback pivotally coupled to the seat and operable between an upright position and a forwardly-folded position; and
a panel pivotally coupled to a center portion of a rear-side of the seatback; and
a detent mechanism coupled to the seatback and configured to resist pivotal movement of the panel relative to the seatback, wherein the panel is pivotable to extend between a first position forward of the seatback and a second position rearward of the seatback when the seatback is in a forwardly-folded position and a third position supported by the detent mechanism when the seatback is in the upright position, wherein the panel is projecting outwardly from the seatback and configured to be used as a tray-table by a vehicle occupant positioned vehicle rearward of the panel.

12. The vehicle seating assembly of claim 11, further comprising:
a headrest coupled to the seatback, wherein the panel is extendable to cover the headrest when the panel is in the first position forward of the seatback.

13. The vehicle seating assembly of claim 11, wherein the seatback defines a recess configured to house the panel.

14. The vehicle seating assembly of claim 13, further comprising:
a retention member that retains the panel within the recess.

15. The vehicle seating assembly of claim 11, wherein the panel comprises:
a first panel and a second panel, wherein the second panel extends from the first panel.

16. The vehicle seating assembly of claim 15, further comprising:
a resistive element coupled to the panel that resists at least one of an extension and a contraction of the second panel relative to the first panel.

17. The vehicle seating assembly of claim 15, wherein the second panel is configured to extend telescopically relative to the first panel.

18. The vehicle seating assembly of claim 15, wherein the second panel is configured to translationally extend relative to the first panel.

* * * * *